United States Patent
Im et al.

(10) Patent No.: US 12,551,505 B2
(45) Date of Patent: Feb. 17, 2026

(54) COMPOSITION FOR BONE REGENERATION COMPRISING METTL7A OVEREXPRESSING STEM CELLS, METHOD FOR PREPARING SAME, AND CELL THERAPY PRODUCT COMPRISING SAME

(71) Applicant: DONGGUK UNIVERSITY INDUSTRY-ACADEMIC COOPERATION FOUNDATION, Seoul (KR)

(72) Inventors: Gun Il Im, Anyang-si (KR); Eu Gene Lee, Goyang-si (KR)

(73) Assignee: DONGGUK UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 569 days.

(21) Appl. No.: 18/002,101

(22) PCT Filed: Jun. 18, 2021

(86) PCT No.: PCT/KR2021/007693
§ 371 (c)(1),
(2) Date: Dec. 16, 2022

(87) PCT Pub. No.: WO2021/256901
PCT Pub. Date: Dec. 23, 2021

(65) Prior Publication Data
US 2024/0082309 A1 Mar. 14, 2024

(30) Foreign Application Priority Data
Jun. 19, 2020 (KR) ........................ 10-2020-0074771

(51) Int. Cl.
*A61K 35/28* (2015.01)
*A61P 19/08* (2006.01)
*C12N 9/10* (2006.01)
*C12N 15/85* (2006.01)

(52) U.S. Cl.
CPC .............. *A61K 35/28* (2013.01); *A61P 19/08* (2018.01); *C12N 9/1007* (2013.01); *C12N 15/85* (2013.01); *C12Y 201/01251* (2015.07); *C12N 2800/107* (2013.01)

(58) Field of Classification Search
None
See application file for complete search history.

(56) References Cited

U.S. PATENT DOCUMENTS 8,119,121 B2 * 2/2012 Fraser ................. C12N 5/0667 606/1
10,232,000 B2 * 3/2019 Ha .......................... A61P 29/00
2018/0325958 A1 11/2018 Binette et al.

FOREIGN PATENT DOCUMENTS

KR 10-2012-0111790 A 10/2012
KR 10-1760618 B1 7/2017
KR 10-2020-0065212 A 6/2020

OTHER PUBLICATIONS

International Search Report corresponding to PCT/KR2021/007693 mailed Oct. 12, 2021 (10 pages, including English translation).
Stich, Stefan, et al., "Characterization of single cell derived cultures of periosteal progenitor cells to ensure the cell quality for clinical application", PLoS One. 12(5): e0178560 (2017).
Yi, Xia, et al., "The key microRNA on lipid droplet formation during adipogenesis from human mesenchymal stem cells", Journal of Cellular Physiology. DOI: 10.1002/jcp.28972, pp. 1-11 (2019).

* cited by examiner

*Primary Examiner* — Blaine Lankford
(74) *Attorney, Agent, or Firm* — Myers Bigel, P.A.

(57) ABSTRACT

The present invention relates to a composition for bone regeneration comprising METTL7A-overexpressing stem cells, a method for preparing the same, and a cell therapy product comprising the same. According to the invention, it is possible to enhance the osteogenic differentiation ability and viability of stem cells compared to conventional stem cell therapy products for bone regeneration.

8 Claims, 5 Drawing Sheets
Specification includes a Sequence Listing.

COMPOSITION FOR BONE REGENERATION COMPRISING METTL7A OVEREXPRESSING STEM CELLS, METHOD FOR PREPARING SAME, AND CELL THERAPY PRODUCT COMPRISING SAME

CROSS-REFERENCE TO RELATED APPLICATIONS

This application is a 35 U.S.C. § 371 national stage application of PCT International Application No. PCT/KR2021/007693, filed Jun. 18, 2021, which claims priority from Korean Patent Application No. 10-2020-0074771, filed Jun. 19, 2020, the contents of which are incorporated herein in their entireties by reference. The above-referenced PCT International Application was published in the Korean language as International Publication No. WO2021/256901 on Dec. 23, 2021.

STATEMENT REGARDING ELECTRONIC FILING OF A SEQUENCE LISTING

A Sequence Listing in ASCII text format, submitted under 37 C.F.R. § 1.821, entitled 1433-60_ST25.txt, 5,034 bytes in size, generated on Sep. 12, 2023, and filed via EFS-Web, is provided in lieu of a paper copy. This Sequence Listing is hereby incorporated herein by reference into the specification for its disclosures.

TECHNICAL FIELD

The present invention relates to a composition for bone regeneration containing METTL7A-overexpressing stem cells, a cell therapy product containing the same, and a method for preparing the composition for bone regeneration.

BACKGROUND ART

Extensive bone defects, such as large bone defects or avascular necrosis of the femoral head, which are caused by trauma, tumors, or diseases and are difficult to repair naturally, are significantly difficult to treat. In addition, although a large number of reconstructive surgeries have been performed, these bone defects are difficult to cure. In addition, when blood supply is blocked due to blood vessel damage or disease, bone regeneration becomes more difficult and should rely on artificial bone. In particular, patients with avascular necrosis of the femoral head are mostly young patients in their 20s to 40s, and when artificial joint replacement is performed, the artificial joint cannot be permanent, and people who have undergone artificial joint replacement are likely to undergo reoperation once or twice during their lifetime. In addition, since bone destruction is severe, reoperation results are poor, which causes the loss of patient's labor and socio-economic costs.

As a method to solve these problems, transplantation of autologous adult stem cells such as bone marrow cells or adipose cells has been studied. However, in the case of extensive bone loss with vascular damage, the transplanted cells are not supplied with blood and are mostly necrotic in the early stages of transplantation, and thus the cells do not exhibit the desired effect. In order to improve the quality of life with an extended average lifespan, there is a need for transplantation of stem cells as a non-surgical bone preservation therapy for the treatment of vascular-free bone disease which is increasing in young age.

The methyltransferase like 7A (METTL7A) gene is a gene encoding a protein that induces methylation, and signaling systems associated therewith include the innate immune system. DNA methylation is a field that has been extensively studied to regulate gene transcription and maintain genome stability. Current research progress of transcriptional regulation by DNA methylation mostly focuses on the promoter region where hypomethylated CpG islands are present with transcriptional activity, as hypermethylated CpG islands generally result in gene repression. This METTL7A is also known as an integral membrane protein anchored into the endoplasmic reticulum membrane that recruits cellular proteins for lipid droplet formation. Furthermore, the intermediate region of METTL7A plays a putative role as S-adenosyl methionine-dependent methyltransferase, and has been found to be involved in thyroid tumor development. However, studies related to METTL7A have not been known in the field of bone regeneration.

Accordingly, the present inventors have found that stem cells overexpressing the METTL7A gene newly identified by RNAseq analysis for bone regeneration (osteogenic differentiation and cell viability) have enhanced viability and osteogenic differentiation ability in an animal model, and thus may overcome the problems of conventional stem cell transplantation, and may exhibit an improved therapeutic effect through fundamental bone regeneration, thereby completing the present invention.

DISCLOSURE

Technical Problem

An object of the present invention is to provide a composition for bone regeneration containing METTL7A gene-overexpressing stem cells.

Another object of the present invention is to provide a cell therapy product for bone regeneration containing the composition.

Still another object of the present invention is to provide a method for preparing a composition for bone regeneration containing METTL7A gene-overexpressing stem cells, the method comprising steps of: 1) constructing a METTL7A gene-overexpressing vector; and 2) introducing the vector, constructed in step 1), into stem cells.

Yet another object of the present invention is to provide a method for treating bone loss comprising a step of administering to a subject any one of the composition, the composition for bone regeneration prepared by the method, and the cell therapy product.

Still yet another object of the present invention is to provide the use of any one of the composition, the composition for bone regeneration prepared by the method, and the cell therapy product, for preventing or treating bone loss.

Technical Solution

To achieve the above objects, one aspect of the present invention provides a composition for bone regeneration containing METTL7A gene-overexpressing stem cells.

Specifically, the METTL7A gene may be SEQ ID NO: 1.

Specifically, overexpression of the METTL7A gene may be achieved through a minicircle vector.

Specifically, the stem cells may be bone marrow stem cells.

Another aspect of the present invention provides a method for preparing a composition for bone regeneration containing METTL7A gene-overexpressing stem cells, the method comprising steps of: 1) constructing a METTL7A gene-overexpressing vector; and 2) introducing the vector, constructed in step 1), into stem cells.

Specifically, the METTL7A gene in step 1) may be SEQ ID NO: 1.

Specifically, the vector in step 1) may be a minicircle vector.

Specifically, the stem cells in step 2) may be bone marrow stem cells.

Still another aspect of the present invention provides a cell therapy product for bone regeneration containing the composition or the composition for bone regeneration prepared by the method.

Yet another aspect of the present invention provides a method for treating bone loss comprising a step of administering to a subject any one of the composition, the composition for bone regeneration prepared by the method, and the cell therapy product.

Still yet another aspect of the present invention provides the use of any one of the composition, the composition for bone regeneration prepared by the method, and the cell therapy product, for preventing or treating bone loss.

A further aspect of the present invention provides the use of any one of the composition, the composition for bone regeneration prepared by the method, and the cell therapy product, for preparing a pharmaceutical composition for preventing or treating bone loss.

Advantageous Effects

According to the present invention, the composition for bone regeneration, the method for preparing the composition for bone regeneration, and the cell therapy product containing the same may increase the osteogenic differentiation ability and viability of stem cells, which have been problematic in the field of conventional bone regeneration therapy, thereby increasing the therapeutic effect of stem cells on bone regeneration.

In addition, the present invention enables the industrial production of stem cells for bone regeneration therapy, providing new opportunities to the domestic biotechnology/life science industry, and the development of functional stem cell therapy products may greatly contribute to the improvement of national health and welfare by improving the quality of life of bone disease patients (in particular, young patients in their 20s to 40s) and reducing the social loss caused by the suspension of social activities of patients.

BEST MODE

The present invention provides a composition for bone regeneration containing METTL7A gene-overexpressing stem cells.

The METTL7A (Methyltransferase Like 7A, EC 2.1.1) gene is a gene that encodes the METTL7A protein, which is a putative methyltransferase, and is a gene involved in the innate immune system. Specifically, the METTL7A gene may be SEQ ID NO: 1. The present inventors have identified the METTL7A gene (Experimental Example 1), and have found that the METTL7A gene affects the osteogenic differentiation ability and viability of stem cells (Experimental Example 2), and stem cells overexpressing the METTL7A gene have increased osteogenic differentiation ability and viability and are effective for bone regeneration.

TABLE 1

| METTL7A | atctgttttt | ttcccttctg | agcaatggag | cttaccatct | ttatcctgag | SEQ ID |
| | actggccatt | tacatcctga | catttccctt | gtacctgctg | aactttctgg | NO: 1 |
| | gcttgtggag | ctggatatgc | aaaaaatggt | tcccctactt | cttggtgagg | |
| | ttcactgtga | tatacaacga | acagatggca | | | |
| | agcaagaagc | gggagctctt | cagtaacctg | caggagtttg | cgggcccctc | |
| | cgggaaactc | | | | | |
| | tccctgctgg | aagtgggctg | tggcacgggg | gccaacttca | agttctaccc | |
| | acctgggtgc | | | | | |
| | agggtgacct | gtattgaccc | caaccccaac | tttgagaagt | ttttgatcaa | |
| | gagcattgca | | | | | |
| | gagaaccgac | acctgcagtt | tgagcgcttt | gtggtagctg | ccggggagaa | |
| | catgcaccag | | | | | |

TABLE 1-continued

```
gtggctgatg gctctgtgga tgtggtggtc tgcaccctgg tgctgtgctc
tgtgaagaac
caggagcgga ttctccgcga ggtgtgcaga gtgctgagac cgggaggggc
tttctatttc
atggagcatg tggcagctga gtgttcgact tggaattact tctggcaaca
agtcctggat
cctgcctggc accttctgtt tgatgggtgc aacctgacca gagagagctg
gaaggccctg
gagcgggcca gcttctctaa gctgaagctg cagcacatcc aggccccact
gtcctgggag
ttggtgcgcc ctcatatcta tggatatgct gtgaaatagt gtgagctggc
agttaagagc
tgaatggctc aaagaattta aagcttcagt tttacattta aaatgctaag
tgggagaaga
gaaacctttt ttttgggggg cggttttttt ggtttgttgt tggttttttt
ttttttttg
gcgggaagaa agagttttgc tcttgttgcc caggctggag tgcaatgacg
tgatctccgc
tcactgcaac ctccacctcg cgggtttaag cgattcttct gcctcagcct
ccctagtagc
tgggattaca ggtgcccacc accatgccca gctaatttgt attttttagtt
gagacagggt
ttcactacgt tggccaggct ggtcttgaac tcctgatctc aggcaatcca
cccacctcag
cctcccaaag tgctgggatg acaggcgtga gcaaccgcac ccagcttaag
gttttttgt
tttgtttga gacggagttt tcgctcttgt tgcccaggct ggagtgcaat
gctgtgatct
cagcttacca caacctccac ctcccgggtt caagtgattc acctgcctca
gcctcctgag
tagctggtat tacaggcatg cgtcaccacg ccggctaatt ttgtactttt
agtagagatg
gtgtttcccc acgttggtca gtctggtctc aaattcctga cctcaggtga
tctgcctgcc
tcggcctccc aaagtgctgt gattacagac gtcagccacc atgcctggcc
tgaaaccttt
tttaggtaaa gttgaattcc atccttaaaa gtttctgtta tatcctattt
agccattttc
tattgtctcc caaagaattc acatcaaaaa aacagctttg aactccccct
tcaaaggaaa
cagtcgactt tcataattag catctaccat tatccccaaa tcttattta
ttcattgact
tgaaattttt tccaattgct tttttttttt tttttttaag gttaagagca
gaggtttact
aggccaaaga aagagaatag ctctctgttg cagagagggg tcctggagaa
atgggttacc
ccagttgtct tatttaaatg gttacccatc agattttaat tttatcttct
ctttgagagc
ttggtaataa gaagcactta aatcactcca aagaagactt taaaagggga
gcagtgaaaa
ggtcttaata atttattgat tgaattaaga aatactagct aattaagaat
ctgagtctaa
acagcacaga tttttctctt ctgcttttaa attgtgtttt aaaaaaagag
acagggggct
gggcgtggtg gctcacgcct gtaatcctag cactttggga ggccgaggcg
ggtggatcac
gaggtaggag ttaaagacca gcctggccaa catggcaaaa ccctactaaa
gatacaaaaa
aaaaaaaaaa ttagccaggc gtggtggtgg gtgcctgtaa tcccaggtac
ttggaaggct
gaggcaggag aatctcttga acccagaagg cgaaggttgc agtgaaccga
gatcatgcca
ttgtactcta gcctgggtga caagagcaag actccgtctc aaaaaaaaaa
aaagaagtag agacaggag acagggtctc actgtgttgc ctaggccggt
cttgaactcc
tgggctcaag tgattctccc accttgacct cctaaattgt tgggattaca
ggtgtgagac
agtgcacctg gccgaaatag ctcaagtttc tgaaaacaa atctgaatct
atttgttatt
cttagcgtca ctggtctggc tttcagaatt aacatacaag gttgccacac
ctagttctgc
ccagctttat gtcttttatt ccagtattcc accaaagttt gttttcctgc
attccagttc
tcaagtctta agataaagat tgtacttgac agtttagtat atccataaaa
ctatttgagg
tggttaaggt tcttgggttc attttccta atactttgct gaatattgta
gattgtaggc
```

TABLE 1-continued

```
aatgaaaaag tctactaaat taggaaaacc ttgaataatt aggtatccta
ggtaagagcc
cctaaacatc aagcaatctg tgagtctgta aagaaataaa tattttttgg
attattctta
tctaattcca cccctgttgg aagatgattt ctttgttctt tgcaactatg
gaagctgtga
aaatcatcac aagtgcctct gaaagcgagt gttaggttgg ttagagggtt
taatattttc
tgcaatggtt tgtaggaatt ttaataaatg tagtatattt tctgagatga
ttttgtaaaa
gtactatttt aaatatcaaa tcaaccaata aattcacatt tgtgttagga
acagaaa
```

In addition, variants of the nucleotide sequence of SEQ ID NO: 1 are also included within the scope of the present invention, and specifically, may comprise a nucleotide sequence having a sequence identity of at least 70%, more preferably at least 80%, even more preferably at least 90%, most preferably at least 95% to the nucleotide sequence of SEQ ID NO: 1. The "% of sequence identity" to a polynucleotide is determined by comparing two optimally aligned sequences over a comparison window, wherein the portion of the polynucleotide sequence in the comparison window may comprise additions or deletions (i.e., gaps) as compared to the reference sequence (which does not comprise additions or deletions) for optimal alignment of the two sequences.

Overexpression of the METTL7A gene may be achieved by introducing a recombinant vector containing the METTL7A gene into stem cells by electroporation.

As used herein, the term "recombinant vector" refers to a recombinant DNA molecule comprising a desired coding sequence and other appropriate nucleotide sequences that are essential for the expression of the operatively-linked coding sequence in a specific host organism. Promoter, enhancer, termination signal and polyadenylation signal that may be used for a eukaryotic cell are well known in the art.

As used herein, the term "operably linked" refers to a functional linkage between a gene expression control sequence and another nucleotide sequence. The gene expression control sequence may be at least one selected from the group consisting of a replication origin, a promoter, and a transcription termination sequence (terminator). The transcription termination sequence may be a polyadenylation sequence (pA), and the replication origin may be an f1 replication origin, an SV40 replication origin, a pMB1 replication origin, an adeno replication origin, an AAV replication origin, or a BBV replication origin, without being limited thereto.

As used herein, the term "promoter" means a DNA region upstream of a structural gene, and refers to a DNA molecule to which RNA polymerase binds to initiate transcription.

The promoter according to one embodiment of the present invention is a transcription control sequence that controls the initiation of transcription of a specific gene, and may be a polynucleotide fragment having a length of about 100 bp to about 2500 bp. Any promoter may be used without limitation as long as it can regulate transcription initiation in a cell, for example, a eukaryotic cell (e.g., a plant cell) or an animal cell (e.g., a mammalian cell such as a human or mouse cell). For example, the promoter may be selected from the group consisting of cytomegalovirus (CMV) promoter (e.g., human or mouse CMV immediate-early promoter), U6 promoter, EF1-alpha (elongation factor 1-a) promoter, EF1-alpha short (EFS) promoter, SV40 promoter, adenovirus major late promoter, pLλ promoter, trp promoter, lac promoter, tac promoter, T7 promoter, vaccinia virus 7.5K promoter, HSV tk promoter, SV40E1 promoter, respiratory syncytial virus (RSV) promoter, metallothionin promoter, β-actin promoter, ubiquitin C promoter, human interleukin-2 (IL-2)) gene promoter, human lymphotoxin gene promoter, and human GM-CSF (human granulocyte-macrophage colony stimulating factor) gene promoter, without being limited thereto.

The recombinant expression vector according to one embodiment of the present invention may be selected from the group consisting of plasmid vectors, cosmid vectors, and bacteriophage vectors. A vector that may be used as the recombinant expression vector may be constructed based on a plasmid (e.g., pcDNA series, pSC101, pGV1106, pACYC177, ColE1, pKT230, pME290, pBR322, pUC8/9, pUC6, pBD9, pHC79, pIJ61, pLAFR1, pHV14, pGEX series, pET series, pUC19, etc.) or phage (e.g., λgt4λB, λ-Charon, λΔz1, M13, etc.) that is used in the art. Specifically, a vector (pMC) for constructing a non-viral minicircle, more specifically, pMCCMVMCS (MN501A-1) may be used.

The recombinant expression vector of the present invention may further contain at least one selectable marker. The marker is a nucleic acid sequence having a property of being selected by a conventional chemical method, and includes any gene capable of distinguishing transfected cells from non-transfected cells. Examples of the marker include, but are not limited to, herbicide resistance genes such as glyphosate, glufosinate ammonium or phosphinothricin, and antibiotic resistance genes such as ampicillin, kanamycin, G418, bleomycin, hygromycin or chloramphenicol.

The recombinant expression vector of the present invention may be constructed using genetic recombination technology well known in the art, and site-specific DNA cleavage and ligation may be performed using enzymes that are generally known in the art.

The electroporation is a method of introducing and transforming a gene or vector into a cell. In the present invention, a recombinant vector containing the METTL7A gene may be introduced into stem cells using an electroporation device (Neon™ Transfection System, MPK5000, CA) under conditions of 1,000 to 1,300 volts (V), specifically, 1,050 volts (V), 30 ms, and 2 pulses.

As used herein, the term "stem cell" refers to a cell having the potential to differentiate into two or more cell types while having self-renewal capacity. Depending on the origin thereof, stem cells may be classified into mesenchymal stem cells, embryonic stem cells, and dedifferentiated stem cells. Specifically, the stem cells may be bone marrow stem cells, more specifically, human bone marrow stem cells.

The composition for bone regeneration may be used for the purpose of treating or preventing bone defects as well as various bone loss diseases. Specifically, the bone loss disease may be at least one selected from the group consisting of osteoporosis, Paget's disease, alveolar bone loss, osteomalacia, and renal osteodystrophy.

The composition for bone regeneration may be prepared through steps of: 1) constructing a METTL7A gene-overexpressing vector; and 2) introducing the vector, constructed in step 1), into stem cells. Specifically, the composition may be prepared through steps of: 1) ligating the METTL7A gene of SEQ ID NO: 1 to pMCCMVMCS (MN501A-1), thereby constructing a METTL7A gene-overexpressing non-viral minicircle vector; and 2) introducing the vector, constructed in step 1), into bone marrow stem cells by electroporation under 1050 volts (V), 30 ms and 2 pulses.

Figure 7:
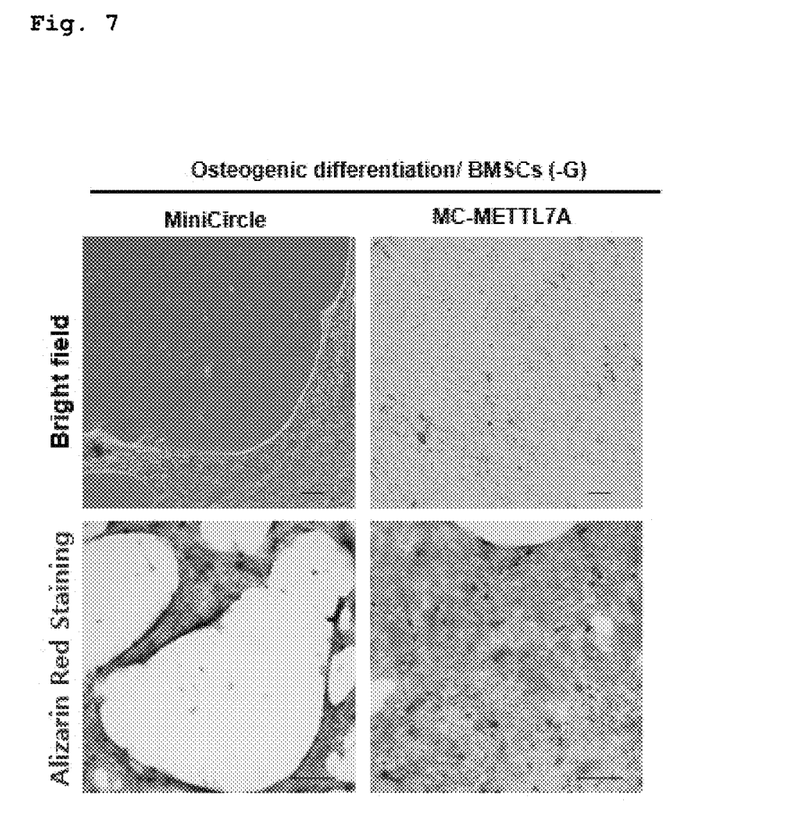
FIG. 7 shows the results of 7-day osteogenic differentiation of cells, in which the METTL7A gene has been knocked out with each of a control and shRNA according to Experimental Example 3 of the present invention.
Figure 8:
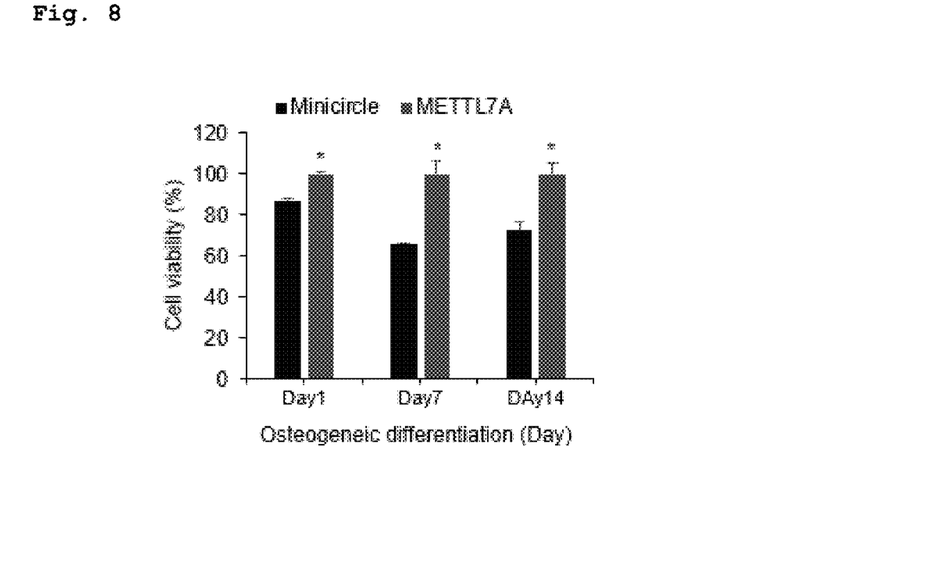
FIG. 8 shows the results of analyzing the cell viability up to 14 days of cells, in which the METTL7A gene has been knocked out with each of a control and shRNA according to Experimental Example 3 of the present invention.

In the composition for bone regeneration according to the present invention, METTL7A gene-overexpressing stem cells exhibit relatively enhanced osteogenic differentiation ability (FIG. 7) and also have increased cell viability (FIG. 8).

The present invention also provides a method for preparing a composition for bone regeneration containing METTL7A gene-overexpressing stem cells, the method comprising steps of: 1) constructing a METTL7A gene-overexpressing vector; and 2) introducing the vector, constructed in step 1), into stem cells.

Step 1) is a step of constructing a METTL7A gene-overexpressing vector that is to be introduced into stem cells. Specifically, in step 1), the METTL7A gene may be SEQ ID NO: 1, and the vector used may be a minicircle vector.

Step 2) is a step of introducing the recombinant vector into stem cells. Specifically, the introduction of the recombinant vector may be performed by electroporation, and the stem cells may be bone marrow stem cells.

The present invention also provides a cell therapy product for bone regeneration containing the composition or the composition for bone regeneration prepared by the method.

As used herein, the term "cell therapy product" refers to a pharmaceutical product that is used for the purpose of treatment, diagnosis, and prevention through a series of actions, including selecting and expanding viable autologous, allogeneic or xenogeneic cells in vitro or changing the biological characteristics of cells by various methods in order to restore cellular and tissue function. Cell therapy products have been classified as pharmaceuticals since 1993 in the United States and since 2002 in Korea. These cell therapy products may be broadly classified into two categories: stem cell therapy products for tissue regeneration or organ function restoration; and immune cell therapy products for immune response regulation such as in vivo immune response suppression or immune response enhancement.

The cell therapy product of the present invention may be administered through any general route as long as it may reach a target tissue. It may be administered parenterally, for example, intraperitoneally, intravenously (i.v.), intramuscularly, subcutaneously, intradermally or directly, without being limited thereto.

The cell therapy product of the present invention may contain therapeutically effective amount of a composition for bone regeneration for the treatment of diseases. The term "therapeutically effective amount" means an amount of an active ingredient or pharmaceutical composition that induces a biological or medical response in a tissue system, animal or human, as determined by researchers, veterinarians, doctors or other clinicians, i.e. the amount that induces relief of the symptoms of the disease or disorder to be treated. It will be obvious to those skilled in the art that the cell therapy product contained in the composition of the present invention will be changed depending on the desired effect. Therefore, the optimal content of the cell therapy product may be easily determined by a person skilled in the art, and may vary depending on various factors, including the type of disease, the severity of the disease, the content of other components contained in the composition, the type of formulation, the patient's age, body weight, general health condition, sex and diet, the time of administration, the route of administration, the secretion rate of the composition, the period of treatment, and drugs used in combination with the composition. It is important for the cell therapy product to be contained in the minimum amount that can exhibit the maximum effect without causing side effects, in view of all the above-described factors.

The cell therapy product may be formulated in a suitable form together with a pharmaceutically acceptable carrier that is generally used for cell therapy. The term "pharmaceutically acceptable" refers to an additive which is physiologically acceptable and, when administered to the human beings, generally does not cause allergic reactions such as gastrointestinal disorders and dizziness, or similar reactions. Examples of the pharmaceutically acceptable carrier include carriers for parenteral administration, such as water, suitable oil, saline, aqueous glucose, and glycol. The composition may further contain a stabilizer and a preservative. Suitable stabilizers include antioxidants such as sodium bisulfite, sodium sulfite or ascorbic acid. Suitable preservatives include benzalkonium chloride, methyl- or propyl-paraben, and chlorobutanol. For other pharmaceutically acceptable carriers, reference may be made to Remington's Pharmaceutical Sciences, 19$^{th}$ ed., Mack Publishing Company, Easton, PA, 1995.

The cell therapy product for bone regeneration may be used for the purpose of treating or preventing bone defects as well as various bone loss diseases. Specifically, the bone loss disease may be any one or more selected from the group consisting of osteoporosis, Paget's disease, alveolar bone loss, osteomalacia, and renal osteodystrophy.

The cell therapy product of the present invention, which contains the composition for bone regeneration containing METTL7A gene-overexpressing stem cells, exhibits enhanced osteogenic differentiation ability compared to a cell therapy product that does not overexpress the METTL7A gene (FIG. 7). In addition, the cell therapy product of the present invention also has increased cell viability (FIG. 8). Thus, the cell therapy product of the present invention may overcome the problems of conventional stem cells for osteogenic differentiation.

The present invention also provides a method for treating bone loss comprising a step of administering to a subject any one of the composition, the composition for bone regeneration prepared by the method, and the cell therapy product.

As described above, the composition, the composition for bone regeneration prepared by the above method, and the cell therapy product have osteogenic differentiation ability, and thus may be administered to a subject suffering from bone loss, thereby treating bone loss.

The subject may have or be suspected of having bone loss, and the bone loss includes not only bone defects but also various bone loss diseases. Specifically, the bone loss disease may be any one or more selected from the group consisting of osteoporosis, Paget's disease, alveolar bone loss, osteomalacia, and renal osteodystrophy.

In the step of administering, any one of the composition, the composition for bone regeneration prepared by the method, and the cell therapy product may be administered by a known method. Specifically, it may be administered parenterally, for example, intraperitoneally, intravenously (i.v.), intramuscularly, subcutaneously, intradermally or directly. More specifically, it may be administered directly to a target site, without being limited thereto.

In addition, any one of the composition, the composition for bone regeneration prepared by the method, and the cell therapy product may be administered in a therapeutically effective amount.

The present invention also provides the use of any one of the composition, the composition for bone regeneration prepared by the method, and the cell therapy product, for preventing or treating bone loss.

The present invention also provides the use of any one of the composition, the composition for bone regeneration prepared by the method, and the cell therapy product, for preparing a pharmaceutical composition for preventing or treating bone loss.

MODE FOR INVENTION

Hereinafter, one or more specific embodiments will be described in more detail with reference to examples. However, these examples are intended to illustrate one or more embodiments, and the scope of the present invention is not limited to these examples.

Figure 1:
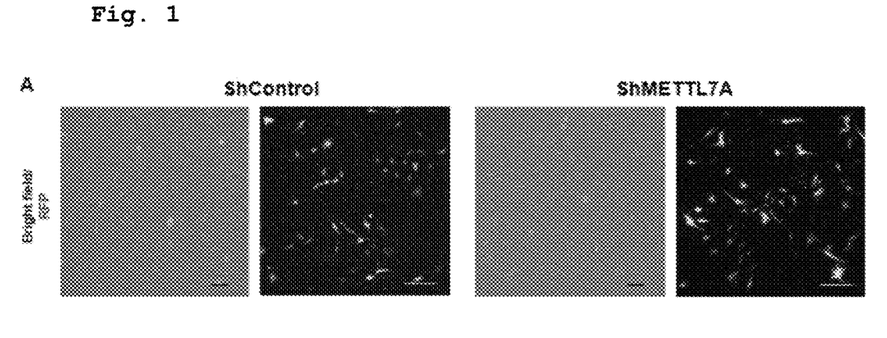
FIG. 1 shows photographs of cells in which the METTL7A gene has been knocked out with each of a control and shRNA according to Experimental Example 2 of the present invention.
Figure 2:
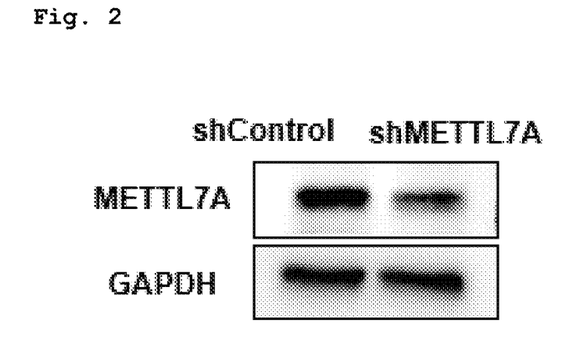
FIG. 2 shows the results of analyzing the expression level of the METTL7A gene in cells, in which the METTL7A gene has been knocked out with each of a control and shRNA according to Experimental Example 2 of the present invention.
Figure 3:
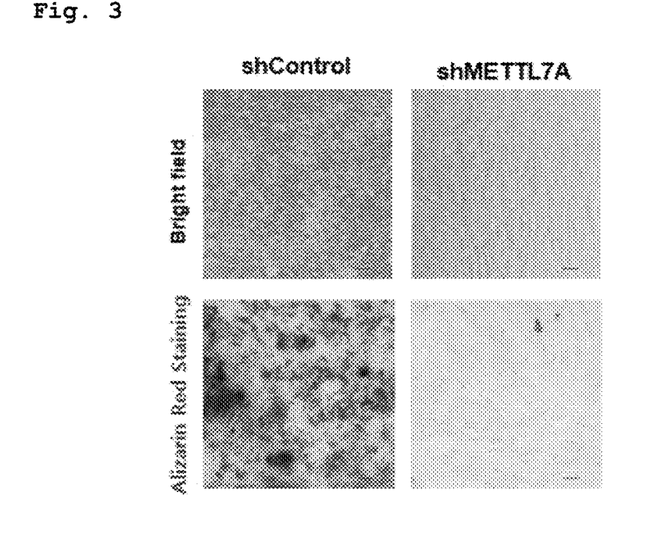
FIG. 3 shows the results of 7-day osteogenic differentiation of cells, in which the METTL7A gene has been knocked out with each of a control and shRNA according to Experimental Example 2 of the present invention.
Figure 4:
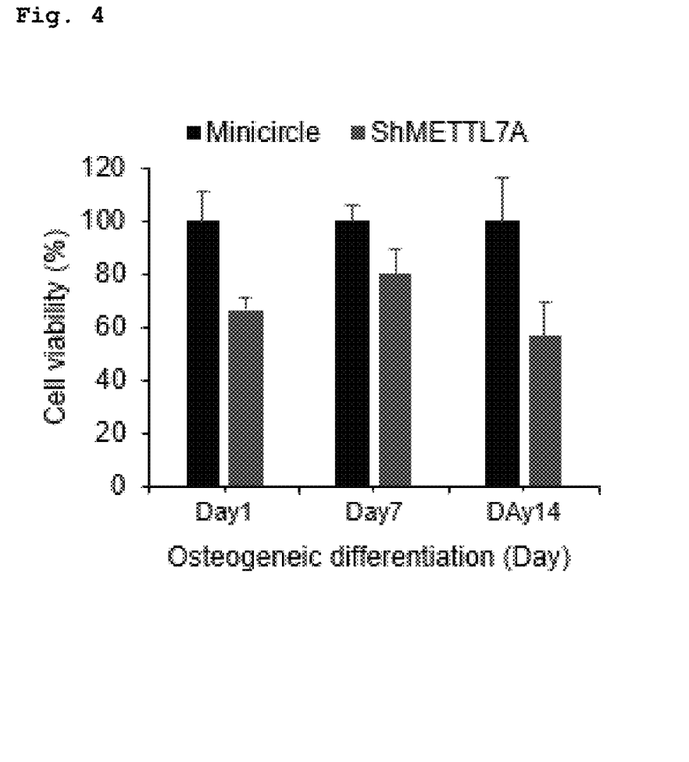
FIG. 4 shows the results of analyzing the cell viability up to 14 days of cells, in which the METTL7A gene has been knocked out with each of a control and shRNA according to Experimental Example 2 of the present invention.
Figure 5:
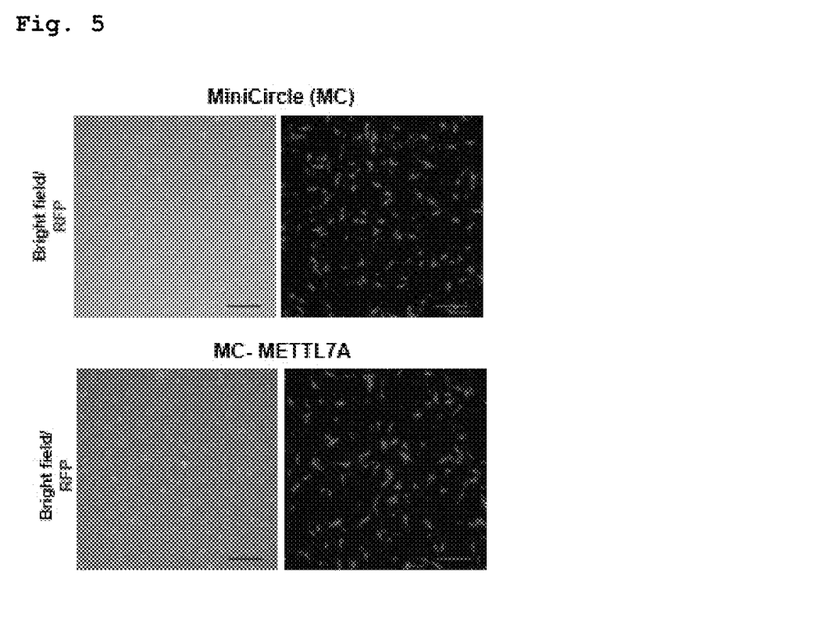
FIG. 5 shows photographs of cells in which the METTL7A gene has been overexpressed with each of a control and shRNA according to Experimental Example 3 of the present invention.
Figure 6:
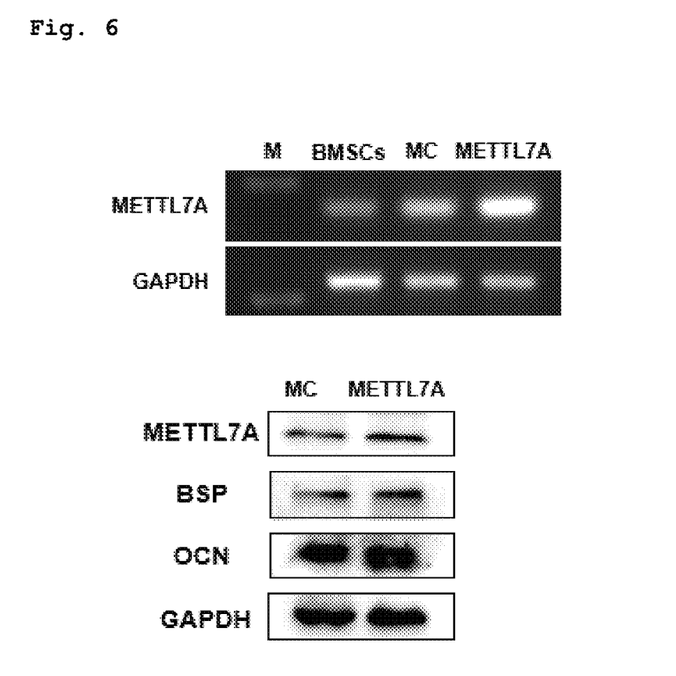
FIG. 6 shows the results of analyzing the expression level of the METTL7A gene/protein in cells, in which the METTL7A gene has been overexpressed with each of a control and shRNA according to Experimental Example 3 of the present invention.
Figure 9:
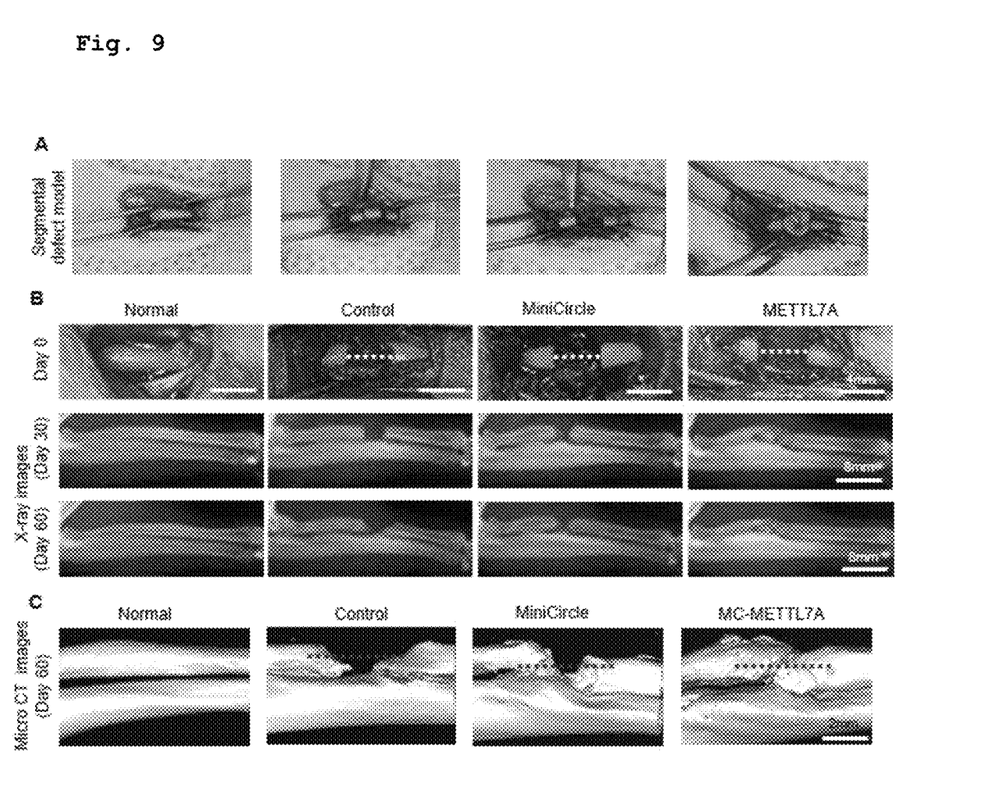
FIG. 9 depicts photographs showing bone regeneration effects in Normal (untreated control group), Control (negative control group), MiniCircle (positive control group) and METTL7A (METTL7A-overexpressing stem cell-administered group) according to Example 1 of the present invention.

The accompanying drawings are intended to illustrate experimental examples and examples. FIG. 1 shows photographs of cells in which the METTL7A gene has been knocked out with each of a control and shRNA according to Experimental Example 2 of the present invention. FIG. 2 shows the results of analyzing the expression level of the METTL7A gene in cells, in which the METTL7A gene has been knocked out with each of a control and shRNA according to Experimental Example 2 of the present invention. FIG. 3 shows the results of 7-day osteogenic differentiation of cells, in which the METTL7A gene has been knocked out with each of a control and shRNA according to Experimental Example 2 of the present invention. FIG. 4 shows the results of analyzing the cell viability up to 14 days of cells, in which the METTL7A gene has been knocked out with each of a control and shRNA according to Experimental Example 2 of the present invention. FIG. 5 shows photographs of cells in which the METTL7A gene has been overexpressed with each of a control and shRNA according to Experimental Example 3 of the present invention. FIG. 6 shows the results of analyzing the expression level of the METTL7A gene/protein in cells, in which the METTL7A gene has been overexpressed with each of a control and shRNA according to Experimental Example 3 of the present invention. FIG. 7 shows the results of 7-day osteogenic differentiation of cells, in which the METTL7A gene has been knocked out with each of a control and shRNA according to Experimental Example 3 of the present invention. FIG. 8 shows the results of analyzing the cell viability up to 14 days of cells, in which the METTL7A gene has been knocked out with each of a control and shRNA according to Experimental Example 3 of the present invention. FIG. 9 depicts photographs showing bone regeneration effects in Normal (untreated control group), Control (negative control group), MiniCircle (positive control group) and METTL7A (METTL7A-overexpressing stem cell-administered group) according to Example 1 of the present invention.

Experimental Example 1: Identification of METTL7A Gene

A gene that enhances bone regeneration (osteogenic differentiation and cell viability) was identified in the following manner.

Total RNA was extracted from the samples using the TRIzol reagent (Invitrogen, Carlsbad, CA, USA). The concentration and purity were determined in terms of optical density at A260 and A260/A280, respectively, using a spectrophotometer (Bio-Tek Instruments). RNA sequencing library of each sample was prepared using the RNA Library Prep Kit (Illumina, San Diego, California, USA). RNA-seq experiments were performed on three types of bone marrow stem cells cultured in alpha MEM and osteogenic media containing various concentrations of glucose. RNA-seq analysis was performed using the Illumina HiSeq 2000 system. Gene expression was normalized to RPKM/FPKM (reads of paired end fragments per kilobase of exon model per million mapped reads/fragment per kb of transcript per million mapped reads). The quality of the sequencing reads generated in the RNA-seq experiment was confirmed using the ExDEGA (Excel-based Differentially Expressed Gene Analysis) tool.

Based on the results of the above experiment, the METTLA7A gene was identified.

Experimental Example 2: Confirmation of Role of METTL7A Gene

In order to confirm the role of the METTL7A gene, the following experiments were conducted.

2-1. Preparation of Stem Cells

Bone marrow stem cells were isolated from bone marrow of seven patients (mean age: 74 years; range: 60 to 87 years). Informed consent was obtained from all donors. All experiments were performed in accordance with the relevant guidelines and regulations. The collection of human samples was approved by the Institutional Review Board at Dongguk University Ilsan Hospital (IRB file no. DUIH 2018-03-015-008). Bone marrow obtained from the human body was diluted with Dulbecco's phosphate-buffered saline (DPBS: Welgene, Cat. LB 001-02, Republic of Korea) and transferred to a conical tube, supplemented with Lymphoprep (Alere Technologies AS, Cat. 1114544, Norway) in a 1:1.25 ratio. The oil layer was removed by centrifuging at 2,000 rpm, brake 0, 30 min, and the cell layer was collected separately in a fresh tube and then diluted 1:2 with DPBS. The dilution was centrifuged at 1,500 rpm for 8 min, and the supernatant was collected separately, diluted with DPBS, and centrifuged repeatedly until it became clear. The bone marrow stem cells were incubated at $1 \times 10^7$ cells per 100 mm dish in αMEM (Gibco, Cat. 12571-063, USA) supplemented with 10% FBS (Gibco, Cat. 16000-044, USA) and 1% penicillin-streptomycin 100× (Welgene, Cat. LS 202-02, Republic of Korea) at 37° C. under 5% $CO_2$.

2-2. Preparation of Recombinant Vector

To confirm the role of the METTL7A gene, shRNA was inserted into a vector, thereby preparing a recombinant vector. Specifically, the shRNA vector pRFP-C-RS was used as a basic framework, and the METTL7A human shRNA plasmid kit (Origene, Cat. TF311498, MD, USA) and the pRFP-C-RS shRNA vector (Origene, Cat. TR30014, MD, USA) were purchased and used. The METTL7A human shRNA plasmid contains the nucleotide sequence that inhibits METTL7A and the restriction enzyme sites that are responsive to chloramphenicol and puromycin (shMETTL7A). The pRFP-C-RS shRNA vector was used as an experimental control (shControl).

2-3. Introduction of Recombinant Vector into Stem Cells

The stem cells in 2-1 were centrifuged at 1,000 rpm for 3 min, and then the supernatant was removed. 100 μl of R buffer (Neon™ Transfection System, MPK10096, CA) was added per 1×10⁶ cells and mixed with each of 10 μg of the shMETTL7A gene-expressing non-viral minicircle vector of 2-2 and 10 μg of the pRFP-C-RS shRNA vector of 2-2. Using an electroporation device (Neon™ Transfection System, MPK5000, CA), electroporation was performed at 1050 V, 30 ms, and 2 pulses. The cells were cultured in αMEM (Gibco, Cat. 12571-063, USA) without antibiotics.

2-4. Confirmation of Introduction of Recombinant Vector by Optical Microscope and RFP Introduction of the recombinant vector into the stem cells (shControl, shMETTL7A) prepared in 2-3 was confirmed by an optical microscope (bright light) and RFP.

As a result, as shown in FIG. 1, it could be confirmed that the pRFP-C-RS shRNA vector and the METTL7A human shRNA plasmid were introduced into the stem cells.

2-5. Analysis of Expression of METTL7A Gene/Protein

Expression of the METTL7A gene/protein in the stem cells (shControl, shMETTL7A) prepared in 2-3 was analyzed by Western blot analysis.

Specifically, the stem cells prepared in 2-3 were allowed to differentiate for 7 days, washed with PBS, and then lysed with an RIPA buffer (Thermo Scientific, Rockford, IL, USA) containing a protease inhibitor cocktail (GenDEPOT, Barker, TX, USA) and a phosphatase inhibitor cocktail (GenDEPOT, Barker, TX, USA). The protein concentration was measured by BCA assay. The protein was separated by SDS-polyacrylamide gel electrophoresis for 2 hours. The gel was transferred to an NC membrane (Whatman®, Cat. E06-07-111, UK) and then blocked with 5% skim milk in 1×TBS with 2% Tween-20. Next, the membrane was incubated with the primary antibody (1:1000) shown in Table 2 below at 4° C. overnight, and then incubated with secondary antibody (1:1000) [anti-rabbit IgG horseradish peroxidase (HRP)-linked antibody, Cell Signaling, #7074/anti-mouse IgG HRP-linked antibody, Cell Signaling, #7076] at room temperature for 2 hours. Antibody-antigen complexes were detected using SuperSignal™ West Femto Maximum Sensitivity Substrate (Thermo Scientific, Cat. 34905, USA), and signal intensities were measured using ChemiDoc™ XRS+ Imaging System (BIO-RAD, USA).

TABLE 2

| Target | Antibody | Company | Catalogue No. |
| --- | --- | --- | --- |
| METTL7A | Anti-METTL7A antibody | Abcam | Ab79207 |
| GAPDH | Rabbit-GAPDH antibody | BETHYL | A300-641A-M |

As a result, as shown in FIG. 2, it could be confirmed that, in the case of shControl, METTL7A expression was shown, but in the case of shMETTL7A, expression of the METTL7A gene/protein was reduced due to the expression of shRNA.

2-6. Evaluation of Osteogenic Differentiation Ability (Alizarin Red Staining)

The degree of mineral accumulation in the stem cells (shControl, shMETTL7A) prepared in 2-3 was examined by optical microscopy and staining with Alizarin Red S (SIGMA-ALDRICH, Cat. A5533-25G, USA). As a result, it could be confirmed that the prepared stem cells had osteogenic differentiation ability.

Specifically, the stem cells prepared in 2-3 were seeded in a 4-well plate at a density of 5×10⁴ cells per well and subjected to osteogenic differentiation in an osteogenic medium (OM) (10% FBS, 1% P/S-containing alpha MEM, 1M beta-glycerol phosphate, 0.1 M L-ascorbic acid 2-phosphate, 500 μM dexamethasone) at 37° C. under 5% $CO_2$ while replacing the medium at 2-3-day intervals. After osteogenic differentiation, the cells were fixed with 4% paraformaldehyde and stained with 2% Alizarin Red S (SIGMA-ALDRICH, Cat. A5533-25G, USA) to evaluate the degree of osteogenic differentiation. In addition, bone marrow stem cells were seeded in a 96-well plate at a density of 1.5×10⁶ cells per well. In this case, DMEM with low glucose (Welgene, Cat. LM 001-06, Republic of Korea) containing 10% FBS and 1% P/S was used to make glucose-supplemented osteogenic medium, and DMEM without glucose (Gibco, Cat. 11966-025, USA) was used to make glucose-free osteogenic medium, and the degree of osteogenic differentiation was evaluated.

As a result, as shown in FIG. 3, it was confirmed that, in the case of shControl, Alizarin red staining was found, indicating mineral accumulation, but in the case of shMETTL7A, Alizarin red staining was hardly visible, indicating that there was no mineral accumulation. Thereby, it can be seen that, when expression of the METTL7A gene is knocked down, mineral accumulation does not occur.

2-7. Cell Viability Analysis

The cell viabilities of the stem cells (shControl, and shMETTL7A) prepared in 2-3 were analyzed.

Specifically, cell viability analysis is used to determine the degree to which water-soluble tetrazolium salt is reduced by mitochondrial NADH dehydrogenase in cells and converted into a colored formazan. The gene-introduced stem cells prepared in 2-3 were seeded in a 96-well plate at a density of 1×10⁴ cells per well using osteogenic medium and subjected to osteogenic differentiation at 37° C. under 5% $CO_2$. Next, WST analysis was performed using the EZ-Cytox kit (DoGEN, Cat. EZ-1000, Republic of Korea) according to the manufacturer's instructions. The reagent contained in the kit was added to the medium at a ratio of 10 μl (reagent):100 μl (medium), and after 60 minutes, the absorbance at a wavelength of 450 nm was measured using the VersaMax Microplate Reader (Molecular Devices, USA). In this manner, the cell viabilities on days 1, 7 and 14 were analyzed.

As a result, as shown in FIG. 4, it was confirmed that the cell viability was lower in shMETTL7A than in shControl on days 1, 7 and 14. This suggests that knockdown of the METTL7A gene leads to a decrease in the cell viability and that the METTL7A gene affects the viability of stem cells in implantation and differentiation of the stem cells.

Experimental Example 3: METTL7A Gene Overexpression

Through Experimental Example 2 above, it could be seen that METTL7A gene-knockout stem cells have not only reduced osteogenic differentiation ability but also reduced viability, suggesting that the METTL7A gene is involved in the osteogenic differentiation and viability of stem cells. Therefore, it was examined whether METTL7A overexpression could enhance the osteogenic differentiation and viability of stem cells.

3-1. Preparation of Stem Cells

Stem cells used in Experimental Example 3 were prepared in the same manner as in Experimental Example 2-1 above.

3-2. Preparation of Recombinant Vector pMC-CMV-MCS (MN501A-1), a vector to produce MiniCircle (MC), was purchased from Systemic Biosciences (SBI) and used as a basic framework to prepare the plasmid vector. Sequences capable of expressing METTL7A gene were inserted downstream of the CMV promoter using the BamHI and NheI restriction sites of the parent plasmid for gene cloning.

METTL7A gene was purchased as MGC clones provided by Invitrogen, and used as a template for DNA PCR. Primers for PCR of the gene are as follows: CCTTCTGAGCAATG-GAGCTT (METTL7A forward, SEQ ID NO: 2), and GGTGGCTGACGTCTGTAATCA (METTL7A reverse, SEQ ID NO: 3). The gene (SEQ ID NO: 1) obtained after PCR was ligated to a pGEM-T-Easy vector for full gene sequencing. The METTL7A gene with an exactly matching gene sequence was inserted into pMC, thereby constructing a METTL7A gene-expressing non-viral minicircle vector (MC-METTL7A). Meanwhile, a pMC vector into which the METTL7A gene was not introduced was used as a control (MiniCircle, MC).

TABLE 3

| METTL7A forward | CCTTCTGAGCAATGGAGCTT | SEQ ID NO: 2 |
| METTL7A reverse | GGTGGCTGACGTCTGTAATCA | SEQ ID NO: 3 |

3-3. Introduction of Recombinant Vector into Stem Cells

The recombinant vectors constructed in 3-2 was introduced into the stem cells (prepared in 2-1) in the same manner as described in Experimental Example 2-3 (MC-METTL7A or MiniCircle (or MC)).

3-4. Confirmation of Introduction of METTL7A Gene-Containing Recombinant Vector by Optical Microscope and RFP Introduction of the recombinant vector (MC-METTL7A or MiniCircle) into the stem cells prepared in 3-3 was confirmed by an optical microscope (bright light) and RFP.

As a result, as shown in FIG. 5, it could be confirmed that each of MC-METTL7A and MiniCircle was introduced into the stem cells.

3-5. Analysis of Expression of METTL7A Gene/Protein

Expression of the METTL7A gene/protein in the stem cells prepared in 3-3 was analyzed.

Specifically, to analyze expression of the METTL7A gene, the stem cells prepared in 3-3 were allowed to differentiate for 7 days in the same manner as in Experimental Example 2-5, washed with PBS, and then lysed with a RIPA buffer (Thermo Scientific, Rockford, IL, USA) containing a protease inhibitor cocktail (GenDEPOT, Barker, TX, USA) and a phosphatase inhibitor cocktail (GenDEPOT, Barker, TX, USA).

Next, expression of the METTL7A gene/protein in the stem cells prepared in 3-3 was analyzed in the same manner as described in Experimental Example 2-5.

As a result, as shown in FIG. 6, it could be confirmed that the METTL7A gene was overexpressed in the METTL7A group of Experimental Example 3-3 compared to the untreated group (BMSCs) and the positive control group (MC), and that the expression level of the METTL7A gene was higher in the METTL7A group than in the positive control group (MC).

3-6. Evaluation of Osteogenic Differentiation Ability (Alizarin Red Staining)

The degree of mineral accumulation in the stem cells (MiniCircle and MC-METTL7A) prepared in 3-3 was examined by optical microscopy and staining with Alizarin Red S (SIGMA-ALDRICH, Cat. A5533-25G, USA). As a result, it could be confirmed that the prepared stem cells had osteogenic differentiation ability.

Specifically, the degree of osteogenic differentiation was evaluated in the same manner as in Experimental Example 2-3.

As a result, as shown in FIG. 7, it was confirmed that Alizarin red staining was more visible in the MC-METTL7A group than in the MiniCircle group, indicating that mineral accumulation occurred more easily in the MC-METTL7A group. Thereby, it can be seen that, when overexpression of the METTL7A gene leads to an increase in the degree of mineral accumulation.

3-7. Cell Viability Analysis

Cell viabilities of the stem cells (MiniCircle and METTL7A) prepared in 3-3 were analyzed.

Specifically, the cell viabilities on days 1, 7 and 14 were analyzed in the same manner as in Experimental Example 2-7.

As a result, as shown in FIG. 8, it was confirmed that the cell viability of METTL7A was higher than that of Mini-Circle on days 1, 7 and 14. This suggests that overexpression of the METTL7A gene increased the cell viability. Thus, it can be seen that the METTL7A gene enables the long-term survival (increased viability) of stem cells in implantation and differentiation of the stem cells, indicating that the METTL7A gene has the effect of enhancing the osteogenic differentiation function of stem cells.

Example 1: Evaluation of Bone Regeneration Effect of METTL7A-Overexpressing Stem Cells To evaluate the actual bone regeneration effect of the METTL7A-overexpressing stem cells prepared in Experimental Example 3-3, an animal experiment was conducted.

Specifically, an 11-week-old male Sprague-Dawley (SD) rat was used in the bone defect model. Five animals were assigned to each of the following four groups randomly: a normal group, a control group, a MiniCircle group, and a MC-METTL7A group. A segmental defect model was created by making a 4-mm bone defect in the forelimb bone of an SD rat. $1 \times 10^6$ MiniCircle vector-transfected bone marrow stem cells (MiniCircle group) or METTL7A gene-transfected bone marrow stem cells (MC-METTL7A group) were implanted into the segmental long-bone defect together with fibrin/thrombin (Green Cross, Republic of Korea). After implantation, the degrees of bone regeneration and bone density were evaluated by visual observation (days 0, 30 and 60), X-ray imaging (days 0, 30 and 60) and micro-CT imaging (day 60) while injecting the rats with immunosuppressive agents (CIPOL; Chong Kun Dang, Republic of Korea) for 8 weeks.

As a result, as shown in FIG. 9, it could be confirmed that bone regeneration was more effective in the METTL7A group (METTL7A-overexpressing stem cell-administered group) than in the control group (negative control group) and the MiniCircle group (positive control group). Specifically, it was confirmed that the stem cells implanted into the bone defect in the METTL7A group mostly differentiated into bone.

So far, the present invention has been described with reference to the embodiments. Those of ordinary skill in the art to which the present invention pertains will appreciate that the present invention may be embodied in modified forms without departing from the essential characteristics of the present invention. Therefore, the disclosed embodiments should be considered from an illustrative point of view, not from a restrictive point of view. The scope of the present invention is defined by the claims rather than the foregoing description, and all differences within the scope equivalent thereto should be construed as being included in the present invention.

What is claimed is:

1. A composition for bone regeneration containing METTL7A gene-overexpressing stem cells.

2. The composition according to claim 1, wherein the METTL7A gene is SEQ ID NO: 1.

3. The composition according to claim 1, wherein overexpression of the METTL7A gene is achieved by a minicircle vector.

4. The composition according to claim 1, wherein the stem cells are bone marrow stem cells.

5. A method for preparing a composition for bone regeneration containing METTL7A gene-overexpressing stem cells, the method comprising steps of:

1) Constructing a METTL7A gene-overexpressing vector; and
2) Introducing the vector, constructed in step 1), into stem cells.

6. The method according to claim 5, wherein the METTL7A gene in step 1) is SEQ ID NO: 1.

7. The method according to claim 5, wherein the vector in step 1) is a minicircle vector.

8. The method according to claim 5, wherein the stem cells in step 2) are bone marrow stem cells.

* * * * *

SEQUENCE LISTING

<160> NUMBER OF SEQ ID NOS: 3

<210> SEQ ID NO 1
<211> LENGTH: 3117
<212> TYPE: DNA
<213> ORGANISM: Homo sapiens

<400> SEQUENCE: 1

| | | | | | | |
|---|---|---|---|---|---|---|
| atctgttttt | ttcccttctg | agcaatggag | cttaccatct | ttatcctgag | actggccatt | 60 |
| tacatcctga | catttccctt | gtacctgctg | aactttctgg | gcttgtggag | ctggatatgc | 120 |
| aaaaaatggt | tcccctactt | cttggtgagg | ttcactgtga | tatacaacga | acagatggca | 180 |
| agcaagaagc | gggagctctt | cagtaacctg | caggagtttg | cgggcccctc | cgggaaactc | 240 |
| tccctgctgg | aagtgggctg | tggcacgggg | gccaacttca | agttctaccc | acctgggtgc | 300 |
| agggtgacct | gtattgaccc | caaccccaac | tttgagaagt | ttttgatcaa | gagcattgca | 360 |
| gagaaccgac | acctgcagtt | tgagcgcttt | gtggtagctg | ccggggagaa | catgcaccag | 420 |
| gtggctgatg | gctctgtgga | tgtggtggtc | tgcaccctgg | tgctgtgctc | tgtgaagaac | 480 |
| caggagcgga | ttctccgcga | ggtgtgcaga | gtgctgagac | cggagggggc | tttctatttc | 540 |
| atggagcatg | tggcagctga | gtgttcgact | tggaattact | tctggcaaca | agtcctggat | 600 |
| cctgcctggc | accttctgtt | tgatgggtgc | aacctgacca | gagagagctg | gaaggccctg | 660 |
| gagcgggcca | gcttctctaa | gctgaagctg | cagcacatcc | aggccccact | gtcctgggag | 720 |
| ttggtgcgcc | ctcatatcta | tggatatgct | gtgaaatagt | gtgagctggc | agttaagagc | 780 |
| tgaatggctc | aaagaattta | agcttcagt | tttacattta | aaatgctaag | tgggagaaga | 840 |
| gaaacctttt | ttttgggggg | cggtttttttt | ggttgttgt | tggttttttt | ttttttttg | 900 |
| gcgggaagaa | agagttttgc | tcttgttgcc | caggctggag | tgcaatgacg | tgatctccgc | 960 |
| tcactgcaac | ctccacctcg | cgggtttaag | cgattcttct | gcctcagcct | ccctagtagc | 1020 |
| tgggattaca | ggtgcccacc | accatgccca | gctaatttgt | atttttagtt | gagacagggt | 1080 |
| ttcactacgt | tggccaggct | ggtcttgaac | tcctgatctc | aggcaatcca | cccacctcag | 1140 |
| cctcccaaag | tgctgggatg | acaggcgtga | gcaaccgcac | ccagcttaag | gttttttttgt | 1200 |
| tttgttttga | gacggagttt | cgctcttgt | tgcccaggct | ggagtgcaat | gctgtgatct | 1260 |
| cagcttacca | caacctccac | ctcccgggtt | caagtgattc | acctgcctca | gcctcctgag | 1320 |
| tagctggtat | tacaggcatg | cgtcaccacg | ccggctaatt | ttgtactttt | agtagagatg | 1380 |
| gtgtttcccc | acgttggtca | gtctggtctc | aaattcctga | cctcaggtga | tctgcctgcc | 1440 |
| tcggcctccc | aaagtgctgt | gattacagac | gtcagccacc | atgcctggcc | tgaaaccttt | 1500 |
| tttaggtaaa | gttgaattcc | atccttaaaa | gtttctgtta | tatcctatttt | agccattttc | 1560 |
| tattgtctcc | caaagaattc | acatcaaaaa | aacagctttg | aactcccct | tcaaaggaaa | 1620 |
| cagtcgactt | tcataattag | catctaccat | tatccccaaa | tcttattta | ttcattgact | 1680 |
| tgaaattttt | tccaattgct | ttttttttt | tttttttaag | gttaagagca | gaggtttact | 1740 |
| aggccaaaga | aagagaatag | ctctctgttg | cagagagggg | tcctgagaa | atgggttacc | 1800 |
| ccagttgtct | tatttaaatg | gttacccatc | agattttaat | tttatcttct | ctttgagagc | 1860 |
| ttggtaataa | gaagcactta | aatcactcca | agaagactt | taaaaaggga | gcagtgaaaa | 1920 |
| ggtcttaata | atttattgat | tgaattaaga | aatactagct | aattaagaat | ctgagtctaa | 1980 |
| acagcacaga | ttttttcttt | ctgcttttaa | attgtgttt | aaaaaaagag | acaggggct | 2040 |
| gggcgtggtg | gctcacgcct | gtaatcctag | cactttggga | ggccgaggcg | ggtggatcac | 2100 |

-continued

```
gaggtaggag ttaaagacca gcctggccaa catggcaaaa ccctactaaa gatacaaaaa    2160
aaaaaaaaaa ttagccaggc gtggtggtgg gtgcctgtaa tcccaggtac ttggaaggct    2220
gaggcaggag aatctcttga acccagaagg cgaaggttgc agtgaaccga gatcatgcca    2280
ttgtactcta gcctgggtga caagagcaag actccgtctc aaaaaaaaaa aaaaaaaaaa    2340
aaagaagtag agacagggag acagggtctc actgtgttgc ctaggccggt cttgaactcc    2400
tgggctcaag tgattctccc accttgacct cctaaattgt tgggattaca ggtgtgagac    2460
agtgcacctg gccgaaatag ctcaagtttc tgaaaacaa atctgaatct atttgttatt    2520
cttagcgtca ctggtctggc tttcagaatt aacatacaag gttgccacac ctagttctgc    2580
ccagctttat gtcttttatt ccagtattcc accaaagttt gttttcctgc attccagttc    2640
tcaagtctta agataaagat tgtacttgac agtttagtat atccataaaa ctatttgagg    2700
tggttaaggt tcttgggttc attttcctta atactttgct gaatattgta gattgtaggc    2760
aatgaaaaag tctactaaat taggaaaacc ttgaataatt aggtatccta ggtaagagcc    2820
cctaaacatc aagcaatctg tgagtctgta aagaaataaa tattttttgg attattctta    2880
tctaattcca cccctgttgg aagatgattt ctttgttctt tgcaactatg gaagctgtga    2940
aaatcatcac aagtgcctct gaaagcgagt gttaggttgg ttagagggtt taatattttc    3000
tgcaatggtt tgtaggaatt ttaataaatg tagtatattt tctgagatga ttttgtaaaa    3060
gtactatttt aaatatcaaa tcaaccaata aattcacatt tgtgttagga acagaaa      3117

<210> SEQ ID NO 2
<211> LENGTH: 20
<212> TYPE: DNA
<213> ORGANISM: Artificial Sequence
<220> FEATURE:
<223> OTHER INFORMATION: METTL7A forward

<400> SEQUENCE: 2
ccttctgagc aatggagctt                                               20

<210> SEQ ID NO 3
<211> LENGTH: 21
<212> TYPE: DNA
<213> ORGANISM: Artificial Sequence
<220> FEATURE:
<223> OTHER INFORMATION: METTL7A reverse

<400> SEQUENCE: 3
ggtggctgac gtctgtaatc a                                             21
```